March 6, 1951      F. S. HALL      2,544,153
OVERFLOW DRAIN FOR TAR COOKERS
Filed Feb. 10, 1947      2 Sheets-Sheet 1
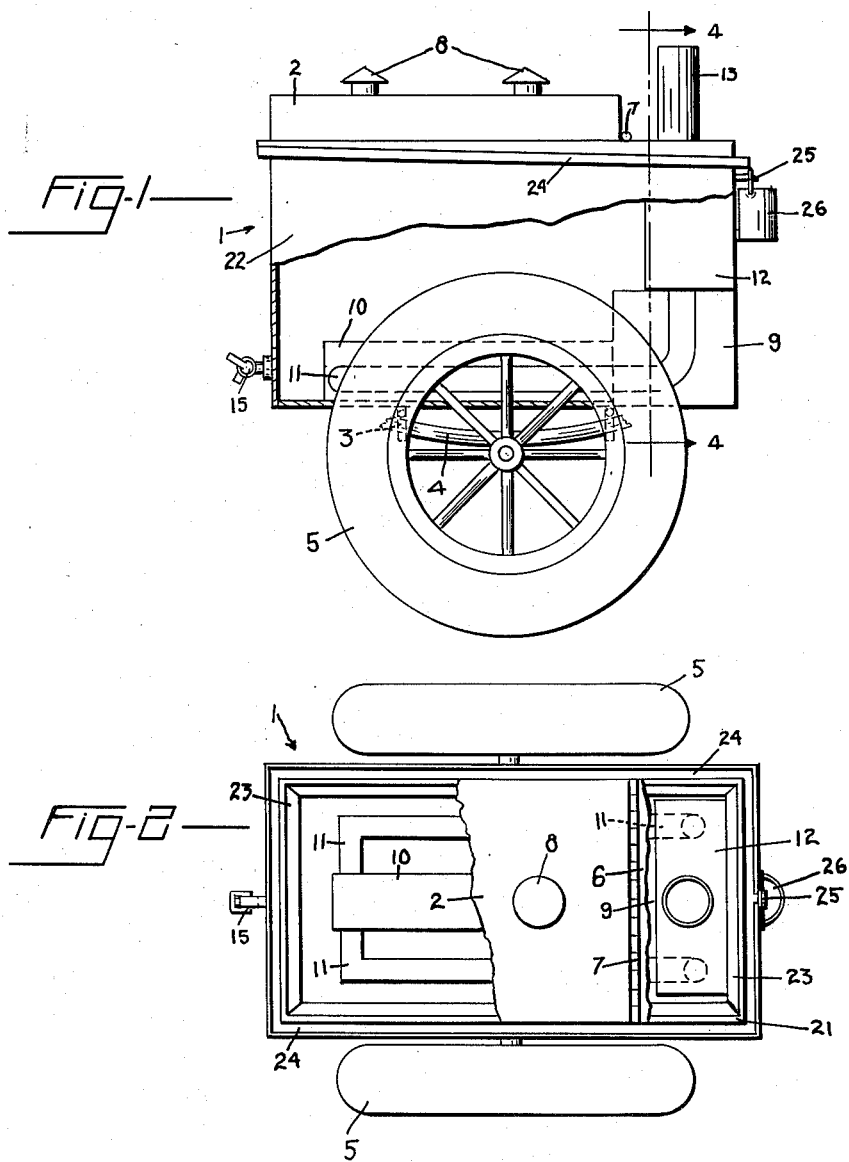
INVENTOR
FRED S. HALL
BY Boyken, Mohler & Beckley
ATTORNEYS March 6, 1951          F. S. HALL          2,544,153
OVERFLOW DRAIN FOR TAR COOKERS
Filed Feb. 10, 1947          2 Sheets-Sheet 2
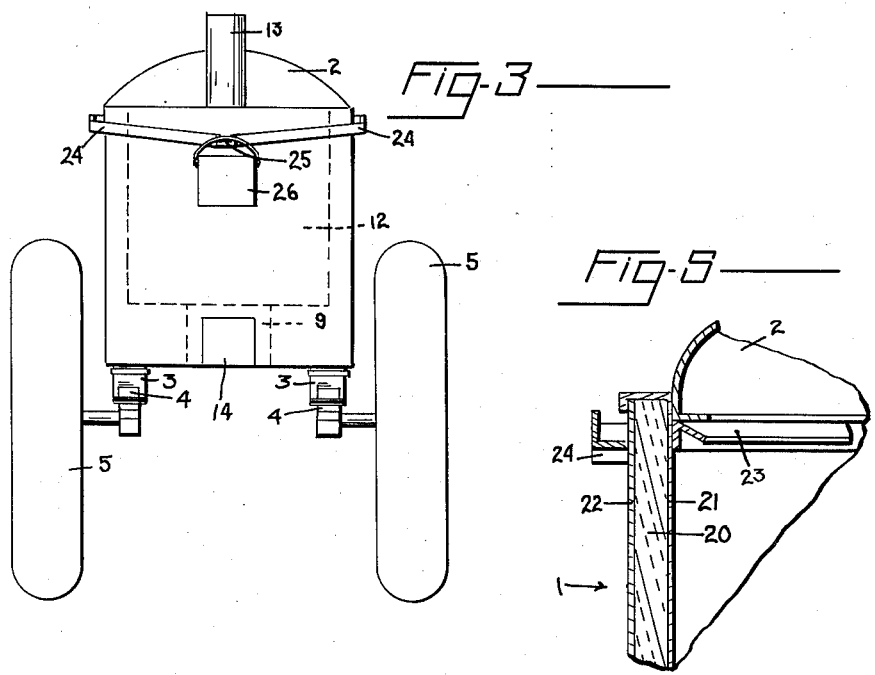
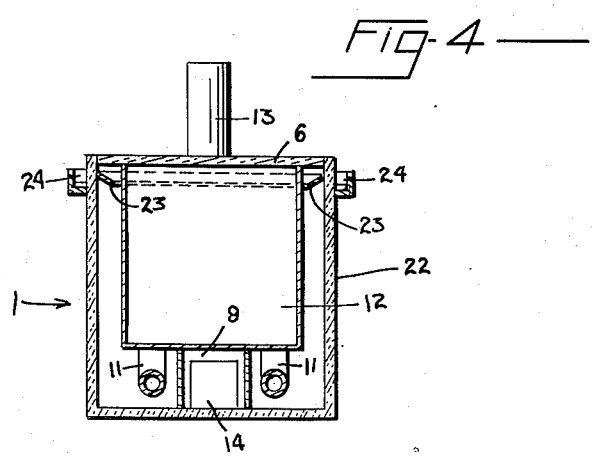
INVENTOR
FRED S. HALL
BY Boyken, Mohler & Beckley
ATTORNEYS Patented Mar. 6, 1951

2,544,153

UNITED STATES PATENT OFFICE 2,544,153

OVERFLOW DRAIN FOR TAR COOKERS

Fred S. Hall, San Francisco, Calif.

Application February 10, 1947, Serial No. 727,593

2 Claims. (Cl. 126—343.5)

This invention relates to a cooker or heater normally used for melting tar and more particularly to a cooker having an outside drain or trough to prevent the cooker from being overlaid with tar.

In the roofing, road-building and other industries where large amounts of melted tar or other materials, which solidify at normal temperatures, are used, it is accepted practice to utilize portable cookers, usually mounted on wheels so that they may be towed as a trailer. These cookers comprise a heating chamber and flues or some other means for applying heat to melt the tar or the like before it can be properly utilized. When the tar is raised to a relatively high temperature, it melts and, as a consequence, an appreciable portion of it vaporizes but liquefies as soon as it comes in contact with a cooler portion of the cooker. In practice, this is usually the lid or the sides of the cooker and a gummy layer of tar or its constituents is thus deposited on these parts. In this molten state the tar also tends to creep up and over the edges of the cooker until it begins to run down the outside of the cooker so that these effects leave this undesirable deposit over the outside of the cooker.

Various types of vents have been developed in an effort to overcome this difficulty, but these tend to become clogged and the expanding gases are likely to cause an explosion. Thus, even on those cookers with vents, they are usually operated with the lid open which, of course, causes the tar to collect on the outer sides of the cooker as explained.

The tar so deposited requires periodic removal which is an extremely difficult operation. During the removal the cooker cannot be used and users are thus forced to have a stand-by unit available. The deposit also tends to interfere with normal use of the cooker and with the wheels, bearings and other moving parts.

The present invention is designed to overcome these difficulties by providing a trough or drain, secured to the outer sides of the cooker and into which the tar runs while still in the molten state. The trough is arranged to entirely surround the cooker and provides a means for carrying off the melted tar so that it collects at one point and may be conveniently removed.

Thus one of the objects of the invention is a trough positioned on the outer sides of the cooker's walls to collect the tar deposited on the walls.

Another object of the invention is a sloping trough on the outer sides of the walls of a tar cooker to collect the tar deposited on said walls.

A further object of the invention is a sloping trough surrounding a tar cooker, positioned near its upper edge to collect the tar deposited thereon.

And still another object of the invention is a tar cooker having a collecting trough in which melted tar is collected to prevent its deposit on the outer walls.

And an even further object is a tar cooker having a collection trough which eliminates the necessity for periodic cleaning of the outside of the cooker.

In the drawings:

Fig. 1 is a side elevation of a tar cooker having such a trough, the wall of the cooker being broken away to show its internal structure.

Fig. 2 is a plan view of the cooker shown in Fig. 1 with a portion of the top and lid cut away.

Fig. 3 is an end view of the cooker shown in Fig. 1.

Fig. 4 is a sectional view along the line 4—4 of Fig. 1.

Fig. 5 is a partial and detailed sectional view of the upper edge of the wall of the cooker.

Although the subject invention is extremely simple and can be easily illustrated, the general structure of a conventional tar cooker is illustrated. Such a device is shown in the drawings and generally comprises a rectangular housing 1, provided with a partial lid 2 mounted on a pair of spring supports 3. The supports are attached to a pair of leaf springs 4 which, in turn are secured to a pair of wheels 5.

The housing is permanently covered, in part, with a top 6, and a strip hinge 7 is provided to permit the lid 2 to be lifted off the housing. A pair of conventional air vents 8 are positioned in the lid to permit the escape of fumes.

The housing surrounds the cooking chamber which is actually divided into compartments. At one end of the chamber is a centrally positioned fire-box compartment 9. A large flue 10, connected to the fire box, extends outwardly therefrom to a point adjacent the opposite end of the cooking chamber. The end of the flue 10 is closed, but a pair of smaller flues 11 extend outwardly from the end of flue 11 at right angles to it and double back toward the fire box. At a point adjacent the fire box they turn upwardly and enter a separate compartment 12 overlying the fire box 9 and which compartment connects with the outside chimney 13.

Thus, when heating means, such as an oil burner, are operated in the fire box 9, through an opening, as at 14, in the end wall, the hot gases and flames travel down flue 10, back through flues 11 and out through the chimney 13 via chamber 12. The tar which partially fills the main cooking chamber and surrounds the flues is thus heated and melted.

A spigot or valve 15 opening into the chamber at some convenient point permits removal of the molten tar. The structure of the walls of the cooking chamber are shown in detail in Fig. 5. It is seen that they comprise a heavy layer of insulation 20 encased in a metal covering comprising an inner sheath 21 and an outer sheath 22, the former of which is bent over the top of the insulation and downwardly a short distance externally of sheath 22, as may be seen in Fig. 5. A guard flange 23 is also attached to the inner sheath 21 and extends around the upper and inner edge of the wall of the cooking chamber. This tends to catch some of the re-liquefied material and permits it to drain back into the cooker. This flange also serves as a stop for the lid 2.

In practice, the cooker is operated with the lid 2 partially or completely open to avoid the possibility of an explosion due to the expansion of the hot vapors. As these vapors rise, they come into contact with the upper horizontal covering portion of sheath 21 where they liquefy. This material tends, because of the flow of vapors, to flow over the edge of the wall and downwardly onto outer sheath 22. To prevent this accumulation a trough or drain, generally designated 24, is secured to the sheath 22 near its upper edge. This trough extends completely around the cooker and is constructed to lie at a slight angle with the horizontal. Its high point is midway of the end wall containing the valve 15 and it slopes slightly downwardly in each direction from this point. It extends around the cooker in each direction, meeting at its lowest point on the opposite end wall just outside the hot compartment 12 that forms part of the flue that is inside housing 1. The trough comprises a metal L-shaped piece, as can be seen in Fig. 5, and is provided with a lip 25 and closely adjacent the compartment 12 at its lowest point to permit the collected material to drain off into a suitable bucket or container 26. Thus, as the vapors liquefy on contact with the upper edges of the walls of the cooker, that part of the material which flows over the side is captured by the trough instead of dripping further downwardly on the side of the cooker. As a consequence of its collection in the bucket 26 at the low point of the trough, it may be conveniently removed as required.

The provision of the sloping trough makes it unnecessary to take the cooker out of service periodically to clean and scrape the hardened material from its sides; the cooker may thus be used more efficiently. In addition, large amounts of tar and other materials are not deposited on the ground and on the wheels and other moving parts and do not interfere with effective operation of the cooker.

The provision of the drain lip 25 closely adjacent the enlarged portion 12 of the hot flue prevents tar in the drain from solidifying in the drain lip so the latter will be free to drain tar when the heater is in operation.

I claim:

1. In a heater for tar and the like having outer side walls, a bottom wall, a firebox and a flue extending from said firebox along one of said side walls; an upwardly opening drain trough on the outer sides of said side walls closely adjacent their upper edges for receiving heated tar that may run over said edges, said trough having a discharge opening formed therein at a point adjacent said flue whereby heat conducted from said flue to said trough will prevent solidification of tar in said opening when said heater is in operation.

2. In a heater for tar and the like having outer side walls, a bottom wall, a firebox and a flue extending from said firebox along one of said side walls; an upwardly opening drain trough on the outer sides of said side walls closely adjacent their upper edges for receiving heated tar that may run over said edges, said trough being inclined downwardly from the side of said heater opposite said flue to the side adjacent said flue for automatically draining tar in said trough to said last mentioned side, said last mentioned side being provided with a drain opening at a point nearest said flue, said point being the lowermost point in said trough.

FRED S. HALL.

REFERENCES CITED

The following references are of record in the file of this patent:

UNITED STATES PATENTS

| Number | Name | Date |
|---|---|---|
| 814,129 | Gufler | Mar. 6, 1906 |
| 1,819,226 | Calimani et al. | Aug. 18, 1931 |
| 2,041,359 | Littleford | May 19, 1936 |
| 2,185,594 | Kittel | Jan. 2, 1940 |

FOREIGN PATENTS

| Number | Country | Date |
|---|---|---|
| 6,701 | Australia | Nov. 26, 1927 |